(No Model.)

J. M. CURRY.
LOOPER FOR SEWING MACHINES.

No. 339,743. Patented Apr. 13, 1886.

Witnesses.
Lauritz W. Müller
John R. Snow

Inventor.
John M. Curry
by his attorney
J. E. Maynadier

UNITED STATES PATENT OFFICE.

JOHN M. CURRY, OF FRAMINGHAM, MASSACHUSETTS.

LOOPER FOR SEWING-MACHINES.

SPECIFICATION forming part of Letters Patent No. 339,743, dated April 13, 1886.

Application filed July 23, 1885. Serial No. 172,375. (No model.)

*To all whom it may concern:*

Be it known that I, JOHN M. CURRY, of Framingham, in the county of Middlesex and State of Massachusetts, have invented an Improved Looper for Sewing-Machines, of which the following is a specification, reference being had to the accompanying drawings, in which—

Figure 1:
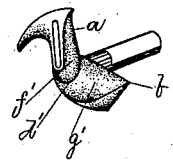
Figure 2:
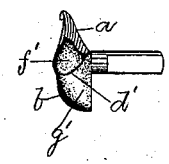
Figure 3:
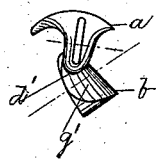
Figure 4:
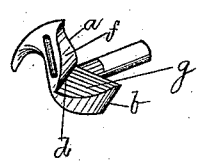
Figure 5:
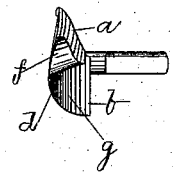
Figure 6:
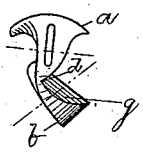
Figure 7:
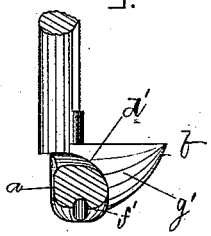
Figure 8:
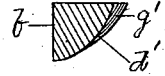
Figure 9:
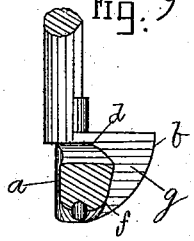
Figure 10:
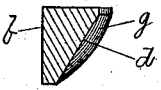

Figure 1 is a perspective view of one of my loopers; Figs. 2 and 3, elevations of the same. Figs. 4, 5, and 6 are like views of the looper previously used. Fig. 7 is a section on the upper dotted line in Fig. 3, and Fig. 8 on the lower dotted line Fig. 3, while Fig. 9 is a section on the upper, and Fig. 10 on the lower, dotted line of Fig. 6.

Heretofore the two members $a$ $b$ of the looper have been so shaped that their junction formed a straight line, this line formed by the junction of the surfaces $f$ and $g$ of $a$ and $b$ being marked $d$ in Fig. 6. Owing to this shape of these surfaces $f$ and $g$, and owing also, to the fact that their junction formed the straight line $d$, the wear of the thread was so concentrated as to soon cut into the looper near the ends of the line $d$; and the object of my invention is to remedy this difficulty, which is a serious one in machines which run rapidly, such as straw-sewing machines, and important to be remedied in all sewing-machines in which loopers are used, for a fine groove is soon cut in the looper deep enough to catch the thread.

My invention has relation to that class of loopers made up of two arms extending from the same shaft. Heretofore in all loopers of this class the junction of the arms has formed a straight line, $d$, as clearly illustrated in Figs. 4 and 5; but by my invention this straight line $d$ is done away with, the junction of the surfaces $f'$ $g'$, each curved as shown, producing the curved line $d'$, and the practical result is that the wear of the thread is distributed instead of being concentrated, and all tendency to form a narrow groove in which the thread can catch is prevented.

The operation of and mode of constructing these loopers are too well known to need description, and the best way of embodying my invention will be clear to all skilled in this art from the drawings. It will be clear, of course, that the exact configuration shown is not essential but it will be also clear to all acquainted with the niceties of construction of these loopers that the main characteristic of my invention is to get the line $d'$ curved substantially as shown, and yet cause the looper to properly distend the loop, and to otherwise perform its functions with that accuracy desirable in all sewing-machines of this class and essential in all such machines run at a high speed.

I am aware of Patents, No. 28,851, of 1860, Reissue No. 2,655, of 1867, No. 240,414, of 1881, No. 316,065, of 1885, and British Patent No. 399, of 1861, which show various forms of loopers with surfaces curved, but in none of them is there anything resembling the straight line $d$ in that kind of looper to which my invention relates, nor the curved line $d'$ in which my invention resides.

The looper shown in the British patent above mentioned lacks the ridge which forms the outer end of part $a$ and also lacks the surface $f$, and therefore lacks the line $d$, formed by the junction of the two surfaces $f$ and $g$; and while it has two parts projecting from a shaft which corresponds roughly to the parts $a$ and $b$ of my looper, and of the looper upon which my invention is an improvement, yet the contiguous surfaces of these parts of the looper in the British patent corresponding roughly to the surfaces $f'$ $g'$ of my looper are radically different from the surfaces $f f'$ and $g g'$ of the loopers shown in the drawings, and consequently there is no line of junction between the contiguous surfaces in the looper of the British patent which does or can correspond to either the line $d$ of the old form of looper shown in Figs. 4, 5, and 6, or to the line $d'$ of my looper.

What I claim as my invention is—

The improved looper for sewing-machines, having the arms $a$ and $b$, shaped on their outer ends as shown, and having the contiguous surfaces $f'$ $g'$ of these arms curved as shown, and forming the curved line of junction $d'$, as and for the purpose specified.

JOHN M. CURRY.

Witnesses:
J. E. MAYNADIER,
JOHN R. SNOW.